United States Patent
Kirino

(10) Patent No.: US 7,855,249 B2
(45) Date of Patent: Dec. 21, 2010

(54) CARBON BLACK PIGMENT FOR ELECTRONIC PAPER, DISPERSION OF THE PIGMENT, AND PROCESS FOR PRODUCTION OF THE PIGMENT

(75) Inventor: Tomoaki Kirino, Tokyo (JP)

(73) Assignee: Tokai Carbon Co., Ltd., Tokyo (JP)

( * ) Notice: Subject to any disclaimer, the term of this patent is extended or adjusted under 35 U.S.C. 154(b) by 427 days.

(21) Appl. No.: 12/085,627

(22) PCT Filed: Dec. 8, 2006

(86) PCT No.: PCT/JP2006/324993

§ 371 (c)(1),
(2), (4) Date: May 27, 2008

(87) PCT Pub. No.: WO2007/069706

PCT Pub. Date: Jun. 21, 2007

(65) Prior Publication Data

US 2009/0286923 A1     Nov. 19, 2009

(30) Foreign Application Priority Data

Dec. 12, 2005    (JP) .............................. 2005-357456

(51) Int. Cl.
    *C08L 83/04*      (2006.01)
(52) U.S. Cl. ........................................ 524/588; 528/28

(58) Field of Classification Search ................. 524/588; 528/28

See application file for complete search history.

(56) References Cited

U.S. PATENT DOCUMENTS 2,780,611 A * 2/1957 Te Grotenhuis ............. 523/216

* cited by examiner

*Primary Examiner*—Kuo-Liang Peng
(74) *Attorney, Agent, or Firm*—Flynn, Thiel, Boutell & Tanis, P.C.

(57) ABSTRACT

A surface-modified carbon black pigment suitable as electronic paper black particles, a silicone oil dispersion of the carbon black pigment, and a process for producing the carbon black pigment are disclosed. The carbon black pigment includes surface-modified carbon black, a diphenylmethane group that is bonded to the carbon black via a urethane bond through a functional group on the surface of the carbon black being bonded to a polysiloxane group. The carbon black dispersion includes a silicone oil and the carbon black pigment, the carbon black pigment being dispersed in the silicone oil at a concentration of 1 to 20 wt %. The process for producing a carbon black pigment for electronic paper includes reacting a functional group on the surface of carbon black with a diphenyl compound having isocyanate groups on both ends in a non-reactive organic solvent so that a diphenylmethane group is bonded to the surface of the carbon black via a urethane bond, and causing the diphenylmethane group to be bonded to a polysiloxane in a silicone oil.

4 Claims, 1 Drawing Sheet

CARBON BLACK PIGMENT FOR ELECTRONIC PAPER, DISPERSION OF THE PIGMENT, AND PROCESS FOR PRODUCTION OF THE PIGMENT

TECHNICAL FIELD

The present invention relates to a carbon black pigment which exhibits excellent dispersibility in a silicone oil and is suitable as a black raw material for electronic paper, a silicone-oil dispersion of the carbon black pigment, and a process for producing the same.

BACKGROUND ART

As a next-generation display, electronic paper having an advantage of paper as a display medium has been extensively researched and developed in addition to an organic EL display and an inorganic EL display. Electronic paper is expected to be a rewritable display device that maintains the convenience of paper from the viewpoint of a reduction in weight and flexibility as compared with a panel display. Electronic paper can be driven at a low voltage, and can hold an image displayed by applying a voltage for a long time without consuming power. Therefore, electronic paper can achieve excellent energy efficiency.

As an image display method for electronic paper, a method that utilizes an electrochemical reaction as a fundamental principle, a method that causes pigment particles to undergo electrophoresis, a method that causes pigment particles to undergo magnetophoresis, and the like have been proposed. In particular, an image display method that causes pigment particles to undergo electrophoresis is widely studied as a promising image display method.

For example, a monochrome image is displayed as follows using a microcapsule electrophoresis method. Specifically, a microcapsule is charged with a transparent insulating liquid such as a silicone oil as a migration medium. Negatively-charged titanium dioxide particles (white particles) and positively-charged carbon black (black particles) are dispersed in the silicone oil. A voltage is applied between a transparent top electrode and a bottom electrode so that the charged particles move in opposite potential directions, whereby a monochrome image is displayed.

FIG. 1 is a schematic view showing the image display principle when applying a positive potential to a transparent top electrode and applying a negative potential to a bottom electrode. In FIG. 1, negatively-charged white titanium dioxide particles move toward the transparent top electrode set at a positive potential, and positively-charged black carbon black particles move toward the bottom electrode set at a negative potential. Therefore, the negatively-charged white titanium dioxide particles are observed through the transparent top electrode.

As shown in FIG. 2, when the polarities of the potentials applied in FIG. 1 are reversed, the positively-charged black carbon black particles move toward the transparent top electrode, and the negatively-charged white titanium dioxide particles move toward the bottom electrode, whereby the black carbon black particles are observed through the transparent top electrode. A monochrome image can be displayed by combining the above-described phenomena.

In order to improve image display accuracy, it is important to disperse the carbon black (black particles) in the migration medium with excellent dispersibility. An improvement in dispersibility of carbon black in an aqueous dispersion has been extensively studied mainly aimed at inkjet printers and the like.

On the other hand, when using the microcapsule electrophoresis method, since a correct image is not displayed if the migration medium enclosed in the microcapsule is affected by a potential, it is necessary to use a non-polar migration medium or a migration medium with low polarity. Therefore, a silicone oil is suitably used for the microcapsule electrophoresis method. This makes it necessary to study the dispersibility of carbon black from a point of view differing from that of an aqueous dispersion (polar medium).

JP-A-2004-526210 discloses an electrophoresis medium in which pigment particles are suspended in a suspension fluid, wherein a polymer is chemically bonded to or crosslinked on the pigment particles in an amount of 1 to 15 wt % based on the pigment particles.

The polymer has a main chain and a plurality of side chains bonded to the main chain, and each of the side chains contains at least about four carbon atoms.

DISCLOSURE OF THE INVENTION

The inventor of the present invention conducted studies on a carbon black pigment which exhibits excellent dispersibility in a silicone oil and is used as electronic paper black particles. As a result, the inventor found that surface-modified carbon black obtained by reacting the surface of carbon black with a polymer that contains a reactive silicone component having a structure similar to that of a silicone oil exhibits excellent dispersibility in a silicone oil.

The present invention was conceived based on the above finding. An object of the present invention is to provide a surface-modified carbon black pigment which can be suitably used as electronic paper black particles, a silicone-oil dispersion of the carbon black pigment, and a process for producing the carbon black pigment.

A carbon black pigment for electronic paper according to the present invention which achieves the above object comprises surface-modified carbon black, a diphenylmethane group that is bonded to the carbon black via a urethane bond through a functional group on the surface of the carbon black being bonded to a polysiloxane group.

A carbon black dispersion for electronic paper according to the present invention comprises a silicone oil as a migration medium, and the above carbon black pigment, the carbon black pigment being dispersed in the silicone oil at a concentration of 1 to 20 wt %.

A process for producing a carbon black pigment for electronic paper according to the present invention comprises reacting a functional group on the surface of carbon black with a diphenyl compound having isocyanate groups on both ends in a non-reactive organic solvent so that a diphenylmethane group is bonded to the surface of the carbon black via a urethane bond, and causing the diphenylmethane group to be bonded to a polysiloxane in a silicone oil.

In the above production process, the surface of the carbon black preferably has a hydroxyl group content of 0.14 μeq/m$^2$ or more, or a carboxyl group content of 0.14 μeq/m$^2$ or more, or the sum of the hydroxyl group content and the carboxyl group content is preferably 0.14 μeq/m$^2$ or more.

The carbon black pigment according to the present invention is produced by modifying the surface of carbon black by reacting the carbon black with a polymer containing a reactive silicone component having a structure similar to that of a silicone oil. The carbon black pigment exhibits excellent dispersibility in a non-polar migration medium or a migration medium with low polarity (e.g., silicone oil) enclosed in a microcapsule for electronic paper utilizing the microcapsule electrophoresis method. Therefore, the carbon black pigment may be suitably used as electronic paper black particles. According to the present invention, a silicone oil dispersion suitable as a migration medium for electronic paper and a process for producing the carbon black pigment are also provided.

BEST MODE FOR CARRYING OUT THE INVENTION

Figure 1:
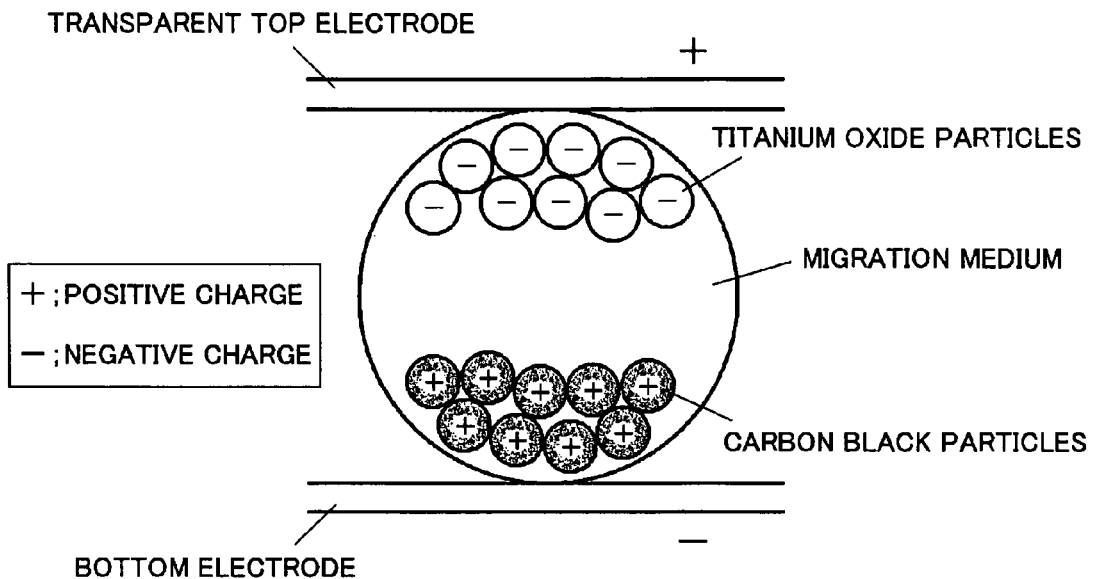
FIG. 1 is a schematic view showing the image display principle when applying a positive potential to a transparent top electrode and applying a negative potential to a bottom electrode.
Figure 2:
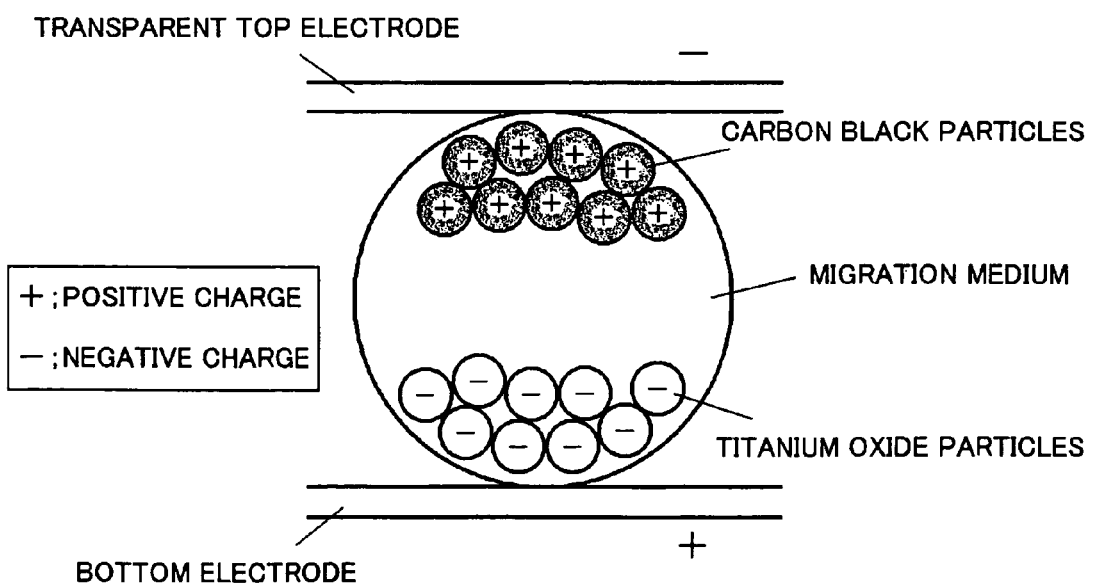
FIG. 2 is a schematic view showing the image display principle when applying a negative potential to a transparent top electrode and applying a positive potential to a bottom electrode.

The carbon black used in the present invention is not particularly limited. Furnace black, thermal black, channel black, or the like may be used. It is preferable to use carbon black having a primary particle diameter measured by electron microscopy of 0.01 to 0.3 μm. If the carbon black has a primary particle diameter of less than 0.01 μm, the carbon black tends to aggregate due to a large interparticle cohesive force. If the carbon black has a primary particle diameter of more than 0.3 μm, since the weight of the resulting surface-modified carbon black increases, the carbon black tends to precipitate in a silicone oil.

The surface-modified carbon black is characterized in that a diphenylmethane group that is bonded to the carbon black via a urethane bond through a functional group on the surface of the carbon black is bonded to a polysiloxane group. Various functional groups are produced on the surface of the carbon black particle through the production process and a post-treatment such as oxidation. In the surface-modified carbon black according to the present invention, acidic functional groups (e.g., hydroxyl group and carboxyl group) have an important function.

The following chemical formula 1 illustrates the surface-modified carbon black of the carbon black pigment for electronic paper according to the present invention. This surface-modified carbon black has a polysiloxane structure in which a hydroxyl group on the surface of the carbon black and a diphenylmethane group are bonded via a urethane bond (OHOCN), and the diphenylmethane group is bonded to a polysiloxane group via a urethane bond.

group having 1 to 6 carbon atoms, or an alkoxy group having 1 to 10 carbon atoms, a and b individually represent integers from 0 to 10, and n represents an integer from 0 to 200.

Specifically, the carbon black pigment for electronic paper according to the present invention is characterized in that the carbon black is surface-modified by causing a reactive silicone having a structure similar to that of a silicone oil (migration medium) to be bonded to the surface of the carbon black. As a result, the carbon black pigment exhibits excellent dispersibility in a silicone oil. The polysiloxane structure may contain a polyorganosiloxane group such as a polydimethylsiloxane group, a polydimethylsiloxane group partially replaced by an alkyl group, a polydimethylsiloxane group partially replaced by an aryl group, or a tris(trialkylsiloxy)silylpropyl group.

A carbon black dispersion prepared by dispersing the surface-modified carbon black in a silicone oil (migration medium) at a concentration of 1 to 20 wt % is enclosed in a microcapsule of electronic paper utilizing an electrophoresis method.

The carbon black pigment for electronic paper according to the present invention containing the surface-modified carbon black is produced by reacting a functional group on the surface of the carbon black with a diphenyl compound having isocyanate groups on both ends in a non-reactive organic solvent (e.g., ester or ketone) so that a diphenylmethane group is bonded to the surface of the carbon black via a urethane bond, and causing the diphenylmethane group to be bonded to a polysiloxane in a silicone oil.

A hydroxyl group and a carboxyl group have an important function as the functional groups on the surface of the carbon black. It is preferable that the hydroxyl group content be 0.14 μeq/m$^2$ or more, or the carboxyl group content be 0.14 μeq/m$^2$ or more, or the sum of the hydroxyl group content and the carboxyl group content be 0.14 μeq/m$^2$ or more. If the content of these functional groups is less than 0.14 μeq/m$^2$, even if a diphenyl compound having isocyanate groups on both ends is uniformly reacted with the carbon black, the diphenyl compound is not sufficiently bonded to the carbon black, whereby precipitation tends to occur even if a polysiloxane is bonded. This makes it difficult to uniformly disperse the surface-modified carbon black in a silicone oil.

The hydroxyl group content and the carboxyl group content may be adjusted by oxidizing the carbon black, if necessary. An appropriate method such as wet oxidation or dry oxidation may be applied.

In the process for producing the carbon black pigment for electronic paper according to the present invention, in order to cause a diphenylmethane group to be bonded to the surface of the carbon black via a urethane bond, functional groups on the surface of the carbon black are reacted with a diphenyl compound having isocyanate groups on both ends in a non-reactive organic solvent (e.g., ester or ketone).

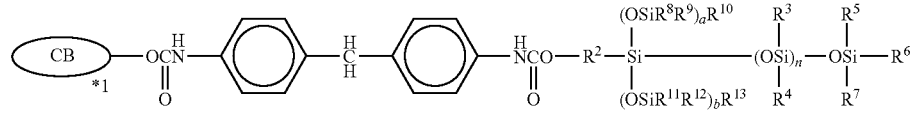

*1 Carbon black wherein $R^2$ represents an alkylene group having 1 to 6 carbon atoms, $R^3$ to $R^{13}$ individually represent an aryl group, an alkyl Examples of the diphenyl compound having isocyanate groups on both ends include paraphenylene diisocyanate, 2-chloro-1,4-phenyl diisocyanate, 2,4-toluene diisocyanate (TDI), 2,6-toluene diisocyanate, 1,5-naphthalene diisocyanate, hexamethylene diisocyanate (HDI), diphenylmethane-4,4'-diisocyanate (MDI), 1,3-xylene-4,6-diisocyanate, diphenyl sulfide-4,4'-diisocyanate, 1,4-naphthalene diisocyanate, and the like. Of these, MDI, TDI, and HDI are preferably used.

The following chemical equation 2 illustrates the above reaction. The chemical equation 2 shows the case where a hydroxyl group (functional group) on the surface of the carbon black is reacted with methyldiphenyl diisocyanate (a diphenyl compound) so that a diphenylmethane group is bonded to the surface of the carbon black via a urethane bond.

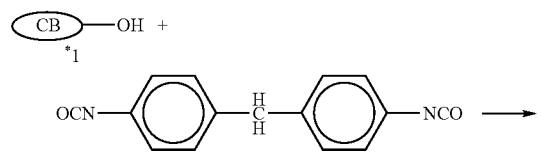

When reacting a diphenyl compound having isocyanate groups on both ends with the carbon black, a diphenyl compound having isocyanate groups on both ends is dissolved in an ester compound (e.g., ethyl acetate or butyl acetate) or a ketone compound which does not react with the isocyanate compound. After the addition of the carbon black, the mixture is deaerated with stirring using a mixer/deaerator, and homogenized using an ultrasonic homogenizer, a high-pressure homogenizer, a process homogenizer, a media mill, or the like. The isocyanate compound is then strongly bonded to the carbon black by heating at a temperature of 25 to 100° C. for an appropriate period of time.

In this case, if the isocyanate compound remains unreacted, aggregation of the reactive silicone and aggregation of the carbon black are promoted. Unreacted isocyanate compounds are removed by processing the dispersion after heating using a high-speed centrifuge.

A diphenylmethane group is thus bonded to the functional group on the surface of the carbon black via a urethane bond. The diphenylmethane group is then bonded to a polysiloxane in a silicone oil to obtain a carbon black pigment for electronic paper according to the present invention.

In the production process according to the present invention, a silicon polymer is not directly bonded to the carbon black. Specifically, a diphenylmethane group is bonded to the carbon black via a urethane bond using a diphenyl compound having isocyanate groups on both ends, and functional groups on the surface of the carbon black and the reactive silicone are reacted through the intermediate (diphenylmethane group) so that a polysiloxane group is bonded to the carbon black.

The following chemical equation 3 illustrates the above reaction. The chemical equation 3 illustrates a chemical reaction in which, after a hydroxyl group on the surface of the carbon black is reacted with methyldiphenyl diisocyanate so that a diphenylmethane group is bonded to the surface of the carbon black via a urethane bond (see chemical equation 2), a polysiloxane is reacted with the resulting carbon black to produce surface-modified carbon black having a polysiloxane structure in which the diphenylmethane group is bonded to a polysiloxane group via a urethane bond (see chemical formula 1).

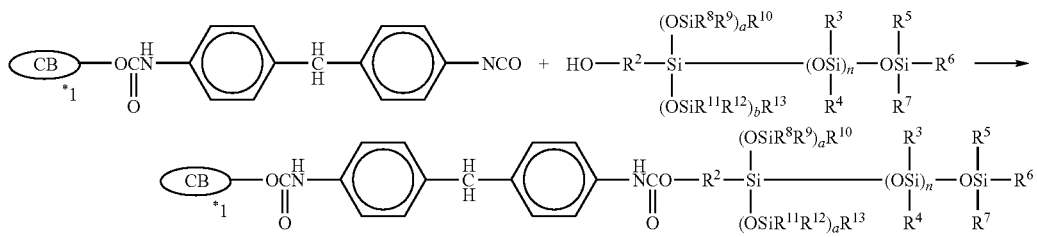

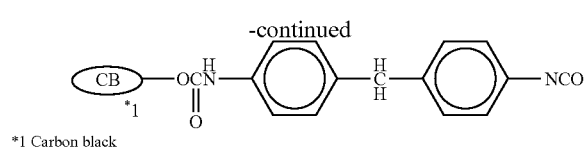

*1 Carbon black

As the reactive silicone used to cause the diphenylmethane group to be bonded to a polysiloxane group, a polysiloxane having a reactive functional group (e.g., amino group, hydroxyl group, carboxyl group, or epoxy group) on its end is used. Since a reactive silicone having reactive functional groups on both ends has insufficient reactivity, it is preferable to use a reactive silicone having a reactive functional group on only one end.

It is preferable that the reactive silicone have a structure similar to the structure of a silicone oil. Since a silicone oil generally has a polysiloxane structure, it is preferable that the reactive silicone have a polysiloxane structure.

Since the surface-modified carbon black according to the present invention is dispersed in a silicone oil with steric hindrance due to the silicone polymer chain bonded to the surface of the carbon black, it is preferable to use a polymer having a molecular weight of 500 to 30,000 as the reactive silicone. If a polymer having a molecular weight of less than 500 is used as the reactive silicone, the surface-modified carbon black exhibits poor dispersibility since steric hindrance due to the polymer chain decreases. If a polymer having a molecular weight of more than 30,000 is used as the reactive silicone, the surface-modified carbon black tends to precipitate due to its weight.

After mixing the carbon black to which a diphenylmethane group is bonded via a urethane bond with the reactive silicone, the mixture is deaerated with stirring using a mixer/deaerator, and then sufficiently homogenized using a triple roll mill, a media mill, or the like. After diluting the mixture with a silicone oil, the mixture is reacted with stirring using an ultrasonic homogenizer, a high-pressure homogenizer, a process homogenizer, a media mill, or the like. After removing the organic solvent by heating, large components are filtered off to obtain a silicone oil dispersion of the surface-modified carbon black pigment. The concentration of the dispersion is adjusted by adding a silicone oil to obtain a carbon black dispersion for electronic paper in which the carbon black pigment is dispersed in a silicone oil at a concentration of 1 to 20 wt %.

EXAMPLES

The present invention is described below by way of examples and comparative examples.

Example 1

Carbon black "TB #7550F" (manufactured by Tokai Carbon Co., Ltd.) was subjected to liquid phase oxidization in an aqueous solution of ammonium persulfate (oxidizing agent) to prepare a carbon black sample having a hydroxyl group content of 0.74 µeq/m$^2$ and a carboxyl group content of 4.8 µeq/m$^2$.

A mixer/deaerator was charged with a methyl ethyl ketone solution in which 12.5 g of diphenylmethane-4,4'-diisocyanate (MDI) was dissolved at a concentration of 15 wt %, 150 g of an inert dimethylpolysiloxane ("TSF451-1000" manufactured by GE Toshiba Silicones Co., Ltd.), and 75 g of the carbon black sample which was sufficiently dried. The mixture was subjected to pre-mixing (stirred for two minutes and deaerated for two minutes), and then homogenized for 30 minutes using a triple roll mill. After the addition of a silicone oil ("KF96L-1cs" manufactured by Shin-Etsu Chemical Co., Ltd.) solution in which 0.875 g of dibutyltin dilaurate was dissolved at a concentration of 10 wt % to the mixture, the mixture was homogenized for 30 minutes using a triple roll mill ("SR-4" manufactured by Inoue Mfg., Inc.). Since methyl ethyl ketone used as the solvent volatilizes, methyl ethyl ketone was appropriately added.

After the addition of methyl ethyl ketone to the mixture (total amount: one liter), the carbon black to which the isocyanate compound was bonded was dispersed in the solvent using an ultrasonic homogenizer ("Ultrasonic Generator US" manufactured by NISSEI Corporation) (10 minutes) and a Nanomizer TL-1500 (manufactured by Tokai Corporation) (pressure: 50 to 150 MPa). The mixture was then heated in a separable flask at 60° C. for two hours with stirring.

The dispersion after heating was centrifuged at 3000 rpm for three minutes. After removing the supernatant liquid, methyl ethyl ketone was added to the mixture. The mixture was then centrifuged. This operation was repeated twice. After the addition of a silicone oil to the residue, the mixture was centrifuged twice.

The residue was equally divided into three portions, and mixed with 16.25 g of a reactive silicone ("TSF4709" manufactured by GE Toshiba Silicones Co., Ltd.). The mixture was homogenized for 30 minutes using a triple roll mill. After the addition of a silicone oil solution in which 0.413 g of dibutyltin dilaurate was dissolved at a concentration of 10 wt %, the mixture was homogenized for 30 minutes using a triple roll mill.

After the addition of a silicone oil to the mixture (total amount: 250 g), the mixture was heated in a separable flask at 60° C. for four hours with stirring. The dispersion after heating was mechanically dispersed at 50 to 150 MPa using a Nanomizer.

The dispersion was heated at 80° C. for one hour in a dryer, and then filtered twice through a No. 131 filter paper (manufactured by Advantec). A silicone oil was then added to the mixture (total amount: 250 g) to obtain a silicone-oil carbon black dispersion 1 with a carbon black concentration of 10 wt %.

Example 2

Carbon black "TB #7550F" (manufactured by Tokai Carbon Co., Ltd.) was subjected to gas phase oxidization with ozone to prepare a carbon black sample having a hydroxyl group content of 1.0 µeq/m$^2$ and a carboxyl group content of 3.2 µeq/m$^2$.

A silicone-oil carbon black dispersion 2 with a carbon black concentration of 10 wt % was produced in the same manner as in Example 1 using the resulting carbon black sample.

Example 3

A carbon black dispersion 3 was produced in the same manner as in Example 1, except for using Special Black 4 (manufactured by Degussa, hydroxyl group content: 0.16 µeq/m$^2$, carboxyl group content of 4.2 µeq/m$^2$) as the carbon black.

Example 4

A carbon black dispersion 4 was produced in the same manner as in Example 1, except for using carbon black (hydroxyl group content: 0.13 µeq/m$^2$, carboxyl group content of 0.37 µeq/m$^2$) which was not oxidized.

Comparative Example 1

Carbon black "TB #7550F" (manufactured by Tokai Carbon Co., Ltd., hydroxyl group content: 0.74 µeq/m$^2$, carboxyl group content: 4.8 µeq/m$^2$) subjected to liquid phase oxidization in the same manner as in Example 1 was used as a carbon black sample. 25 g of the carbon black sample was mixed with 16.25 g of a reactive silicone ("TSF4709" manufactured by GE Toshiba Silicones Co., Ltd.). The mixture was then homogenized for 30 minutes using a triple roll mill. After the addition of a silicone oil solution in which 0.413 g of dibutyltin dilaurate was dissolved at a concentration of 10 wt %, the mixture was homogenized for 30 minutes using a triple roll mill.

After the addition of a silicone oil to the mixture (total amount: one liter), the carbon black was dispersed using an ultrasonic homogenizer (10 minutes) and a Nanomizer (manufactured by Tokai Corporation) (pressure: 50 to 150 MPa). The mixture was then heated in a separable flask at 60° C. for two hours with stirring.

The dispersion after heating was centrifuged at 3000 rpm for three minutes. After removing the supernatant liquid, a silicone oil was added to the mixture. The mixture was then centrifuged twice. After the addition of a silicone oil to the mixture (total amount: 250 g), the mixture was mechanically dispersed at 50 to 150 MPa using a Nanomizer to obtain a silicone-oil carbon black dispersion 5 with a carbon black concentration of 10 wt %.

The average particle diameter of carbon black agglomerates in the dispersion was measured using a Microtrac grain size analyzer ("9340-UPA150" manufactured by Honeywell). The viscosity of the dispersion was measured using a vibratory viscometer (manufactured by Yamaichi Electronics Ltd.). Table 1 shows a change in measurement results with time.

TABLE 1

|  |  | Dispersion 1 | Dispersion 2 | Dispersion 3 | Dispersion 4 | Dispersion 5 |
|---|---|---|---|---|---|---|
| After 0 weeks | Average particle diameter (nm) | 146 | 178 | 304 | 505 | 2045 |
|  | Viscosity (cp) | 1.75 | 1.45 | 1.14 | 1.02 | 0.80 |
| After 1 week | Average particle diameter (nm) | 196 | 204 | 359 | 544 | 2225 |
|  | Viscosity (cp) | 1.49 | 1.23 | 1.08 | 1.05 | 0.90 |
| After 2 weeks | Average particle diameter (nm) | 161 | 187 | 456 | 595 | 2190 |
|  | Viscosity (cp) | 1.53 | 1.34 | 1.15 | 1.07 | 0.93 |
| After 3 weeks | Average particle diameter (nm) | 154 | 183 | 434 | 628 | 2188 |
|  | Viscosity (cp) | 1.54 | 1.35 | 1.16 | 1.08 | 0.94 |
| After 4 weeks | Average particle diameter (nm) | 152 | 181 | 445 | 632 | 2195 |
|  | Viscosity (cp) | 1.52 | 1.33 | 1.14 | 1.10 | 0.92 |

As shown in Table 1, the average particle diameters of the carbon black agglomerates in the dispersions 1 to 3 according to the examples of the present invention were small and changed with time to only a small extent. On the other hand, the dispersions 4 and 5 according to the comparative examples which were outside the range of the present invention had an average particle diameter significantly larger than those of the dispersions 1 to 3 and showed a large change in average particle diameter with time.

The invention claimed is:

1. A carbon black pigment for electronic paper comprising surface-modified carbon black, a diphenylmethane group that is bonded to the carbon black via a urethane bond through a functional group on the surface of the carbon black being bonded to a polysiloxane group.

2. A carbon black dispersion for electronic paper comprising a silicone oil and the carbon black pigment according to claim 1, the carbon black pigment being dispersed in the silicone oil at a concentration of 1 to 20 wt %.

3. A process for producing a carbon black pigment for electronic paper, the process comprising reacting a functional group on the surface of carbon black with a diphenyl compound having isocyanate groups on both ends in a non-reactive organic solvent so that a diphenylmethane group is bonded to the surface of the carbon black via a urethane bond, and causing the diphenylmethane group to be bonded to a polysiloxane in a silicone oil.

4. The process for producing a carbon black pigment for electronic paper according to claim 3, wherein the surface of the carbon black has a hydroxyl group content of $0.14\ \mu eq/m^2$ or more, or a carboxyl group content of $0.14\ \mu eq/m^2$ or more, or the sum of the hydroxyl group content and the carboxyl group content is $0.14\ \mu eq/m^2$ or more.

* * * * *